United States Patent Office 3,562,356
Patented Feb. 9, 1971

3,562,356
BLOCK COPOLYMER BLENDS WITH CERTAIN ETHYLENE-UNSATURATED ESTER COPOLYMERS
David D. Nyberg, Sunnyvale, and Willis R. Hendricks, Palos Verdes Estates, Calif., assignors to Shell Oil Company, New York, N.Y., a corporation of Delaware
No Drawing. Continuation-in-part of application Ser. No. 490,119, Sept. 24, 1965. This application Nov. 19, 1968, Ser. No. 777,134
Int. Cl. C08f 29/50
U.S. Cl. 260—876    6 Claims

ABSTRACT OF THE DISCLOSURE

Compositions exhibiting improved flex cracking resistance and improved resistance to solvent action and ozone comprising (A) a block copolymer of the formula $$A-(B-A)_{1-5}$$

wherein each A is a polymer block of a monovinyl arene and each B is a polymer block of a conjugated diene, and hydrogenated derivatives thereof, and (B) is a copolymer of ethylene with either an acrylate or a vinyl carboxylate.

BACKGROUND OF THE INVENTION

This application is a continuation-in-part of copending application Ser. No. 490,119, filed Sept. 24, 1965, now U.S. Pat. No. 3,424,649, granted Jan. 28, 1969.

This invention is concerned with new compositions of matter. More particularly, it pertains to special compositions containing defined block copolymers together with compatible copolymers for the improvement in a variety of physical properties.

Block copolymers which exhibit elastomeric properties at ambient temperature and which are thermoplastic at elevated temperature have been developed in recent years from such monomers as styrene and conjugated dienes to form a family of polymers exhibiting the general characteristics of vulcanized rubbers which do not require vulcanization to attain their maximum physical properties. Dependent upon the content of the monomer forming the high glass transition end blocks, e.g., styrene, the properties of these polymers will resemble those of vulcanized rubber or, with increasing styrene content will more nearly resemble improved thermoplastic such as high impact polystyrene or the like. The end uses of these new polymers are diverse and make many stringent demands on their physical properties. For example, in the use of these compounds for shoe components and the like which are subjected to flexing, it has been found that flex cracking will occur in many instances earlier than is desirable. Moreover, due to any unsaturation of any of the polymer blocks in the copolymers they may be subject to ozonolysis and degradation. It is possible to modify these above-mentioned properties by the incorporation of a wide variety of other polymers but in so modifying the basic copolymer it is usually found to be the case that other physical properties are changed in one undesirable aspect or another.

It is an object of the present invention therefore to provide improved compositions comprising block copolymers modified in such a way as to improve their flex cracking resistance and at the same time to maintain to a large degree the original desirable physical characteristics of these polymers. Furthermore, it is an object of the present invention to provide improved compositions comprising block copolymers and an auxiliary polymer exhibiting substantially improved solvent resistance and ozone resistance. Other objects will become apparent during the following detailed description of the invention.

SUMMARY OF THE INVENTION

Now, in accordance with the present invention, improved compositions exhibiting particularly improved flex cracking resistance and improved resistance to solvent action and ozone are provided comprising a block copolymer as more particularly defined hereinafter together with one or more of two classes of auxiliary copolymers, namely, copolymers of ethylene with esters of terminally ethylenically-unsaturated monocarboxylic acids and saturated aliphtic alcohols, and esters of saturated monocarboxylic acids and terminally ethylenically-unsaturated aliphatic alcohols, all as more fully described hereinafter. The present invention is based upon the findings that flex cracking resistance, ozone resistance, cut growth resistance and solvent resistance are all substantially improved in an unpredictable manner while at the same time and, just as unpredictably, the other physical properties such as modulus of the block copolymers are not deleteriously affected.

The block copolymers (which may be either linear or branched) forming the important elastomeric component of the present composition have the general configuration $A(B-A)_n$, wherein $n$ is a whole integer between 1 and 5. If the copolymer is not hydrogenated, the blocks A comprise poly(monovinyl arene) blocks while the block B is a poly(conjugated diene) block. The blocks A normally have average molecular weights as determined by osmotic molecular weight methods as they are related to intrinsic viscosity of between about 8,000 and 45,000, while the conjugated diene polymer block has average molecular weights between about 35,000 and 150,000. If the copolymers are hydrogenated the molecular weight ranges remain roughly the same. Two preferred species of such block copolymers include those having the block configuration polystyrene - polybutadiene - polystyrene and polystyrene-polyisoprene-polystyrene as well as their hydrogenated counterparts. The hydrogenated counterpart of the second of the above defined block copolymers is of special interest, not only because of its higher oxidation stability but because of the elastomeric nature of the hydrogenated mid-section, which resembles that of an ethylene-propylene rubber while the end blocks either remain as polyvinyl arene blocks or if hydrogenated become saturated blocks typified by polyvinylcyclohexane polymer blocks. Thus, the fully hydrogenated preferred species has the block configuration polyvinylcyclohexane - ethylene-propylene copolymer-polyvinylcyclohexane.

Polymers having more complicated structures than the basic three-block structure discussed above may be utilized in addition to or in place of the basic structure materials. These may be linear, branched, or star-shaped block copolymers in which the individual blocks have the chemical characteristics and average block molecular weights discussed hereinbefore. The number of blocks contemplated is not critical as long as there are at least three and preferably 3–8 polymer blocks in the molecule regardless of their specific configuration as long as there are at least two blocks of monovinyl arenes separated by an elastomeric segment. In defining molecular weights, any adjacent A—A block pairs or B—B block pairs are regarded as a single block.

These particular block copolymers have the unique feature of attaining the stres-strain properties of an elastomer without the requirement that it be subject to curing or vulcanization. Thus, they are sharply differentiated from other rubbers such as natural rubber, polybutadiene, SBR, and the like which require vulcanization in order to attain satisfactory stress-strain properties.

The subject block copolymers are modified in accordance with the present invention with one or more of a mixture of two special types of polymers, 100 parts by weight of the block copolymer being so modified with 10-150 parts by weight of the supplementary polymer. Preferably the supplementary polymer is present in an amount between about 25-75 parts by weight per 100 parts of the block copolymer.

The ethylene-copolymers which can be used in accordance with the invention can be characterized in a general way as long-chain hydrocarbon backbones which are randomly and irregularly substituted with side chains which are no more than about three carbon atoms in length. More specifically, the polymers are copolymers of ethylene with terminally ethylenically unsaturated organic compounds containing 4–5 carbon atoms. The preferred comonomers are selected from the group consisting of esters of terminally ethylenically-unsaturated monocarboxylic acids and saturated aliphatic alcohols and esters of saturated monocarboxylic acids and terminally ethylenically-unsaturated aliphatic alcohols. Examples of such comonomers are unsaturated esters such as vinyl acetate, ethyl acrylate and methyl acrylate.

The ethylene-vinyl acetate copolymers which are to be used in the compositions of the invention correspond to the general formula

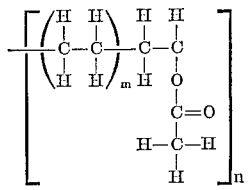

wherein $n$ ranges from about 15 to about 250. The actual occurrence of the acetate substituents along the hydrocarbon chain is of a random character and thus the letter $m$ denotes the average number of ethylene units per vinyl acetate unit in the molecule rather than the presence of regularly recurrent units having the composition given within the above brackets. The value for $m$ ranges from about 6.5 to 40 and preferably from about 8 to 30. Typical properties of ethylene-vinyl acetate copolymer which may be used in the invention are as follows:

A corresponding family of ethylene-ethylacrylate type of copolymers may be utilized as well. In these, the comonomer is generically described as a terminally ethylenically unsaturated ester containing 4–5 carbon atoms, the ester being an unsaturated monocarboxylic acid esterified with a saturated aliphatic alcohol. Ethylacrylate and methacrylate are typical of this class. In both of these types of ethylene-ester copolymers, the ester comonomer is utilized in an amount between 8 and 33% by weight of ester unit based on the total copolymer. Preferably this is an amount between about 10 and 30% (best 20–30%) thereof. Preferred densities are between 0.85 and 0.97 at 23° C., still more preferably 0.91–0.93. Physical properties of typical copolymers of this description are as follows:

TABLE II.—PROPERTIES OF OTHER ETHYLENE COPOLYMERS

| Sample | Ethylene/ethyl acrylate copolymers | | Ethylene/methyl acrylate copolymers | |
| --- | --- | --- | --- | --- |
| Wt. percent comonomer | 20 | 30 | 17.4 | 23.6 |
| Melt index, g./10 min | 18 | 18 | 3.5 | 6.6 |
| Molecular weight | 32,000 | | 41,000 | 38,000 |
| Tensile strength, p.s.i | 1,200 | 750 | 1,180 | 1,200 |
| Elongation at break, percent | 700 | 800 | 710 | 763 |
| Density | 0.927 | 0.932 | 0.942 | 0.947 |

The advantages of the present invention are gained by combining the block copolymer with the supplementary polymer under any desired type of procedure including solution blending, latex blending, extrusion blending, compression molding or other types of thermoforming operations which may result in either nibs or chips which are later to be used in forming articles of commercial or in the forming operation resulting in such articles. The alteration in physical properties will differ in operations as extrusion depending on the applied shear relative to the axis of extrusion in which the testing is carried out. Data given in the working examples will illustrate this point.

The compositions of the invention may be modified with supplementary materials including monovinyl arene polymers such as polystyrene, low molecular weight plasticizing polymers such as low molecular weight alpha-methyl styrene polymers, resins such as coumarone-indene resins, fillers such as mineral particulate fillers, including titanium dioxide, calcium carbonate and the like as well as carbon black and especially with mineral extending oils for the purpose of reducing the overall cost of the composition and alteration of the physical properties thereof. The effect of adding the subject classes of supplementary polymers to the block copolymer is noted regardless of the other components of the compositions which may be present. The working examples will also illustrate this point.

One of the striking aspects of the compositions of this invention was finding that low melt indexes in the supplementary polymers, e.g., 0.25–5, preferably 1–5 melt index results in especially outstanding improvement in ozone resistance to the block copolymer blends.

The resistance to softening or absorption by oil is substantially improved by the presence of the supplementary polymers and, at equivalent hardness, the oil resistance of these blends is especially superior to corresponding blends of the block copolymers with polyolefins. Other benefits of the blends compared with the unmodified block copolymers include the improved resistance of molded articles to distortion and shrinkage at elevated temperatures.

The following examples illustrate the benefits gained by blending the subject block copolymers with a variety of the supplementary polymer.

Example I

Blends of a typical block copolymer were made with several species of each of the three classes of supplemen-

TABLE I.—PROPERTIES OF ETHYLENE-VINYL ACETATE COPOLYMERS

| | A | B | C | D | E | F | G | H | I | J |
| --- | --- | --- | --- | --- | --- | --- | --- | --- | --- | --- |
| Wt. percent vinyl acetate | 33 | 27–29 | 28 | 28 | 28 | 28 | 23 | 23 | 18 | 18 |
| C₂-/vinyl acetate mole ratio | 6.5/1 | | 8/1 | 8/1 | 8/1 | 8/1 | 10/1 | 10/1 | 14/1 | 14/1 |
| Melt index, g./10 min | 25 | 125–175 | 100 | 15 | 25 | 15 | 400 | 100 | 2 | 150 |
| Molecular weight | 28,000 | | | | 28,000 | 33,000 | | | | |
| Softening point (R and B), °F | 243 | 192 | | 252 | 255 | 276 | | | | |
| Tensile strength, p.s.i | 1,000 | 460 | | 1,700 | 1,000 | 2,000 | | | | |
| Elongation at break, percent | 700 | 650 | | 800 | 700 | 750 | | | | |
| Density | 0.95 | 0.95 | | | 0.95 | 0.95 | | | | | tary polymers in accordance with the present invention. Table III below give the typical set of physical properties for each of the individual polymers concerned.

rubbery than the corresponding polyethylene-block polymer blends.

TABLE III.—PROPERTIES OF POLYMERS

| | Type* | | | | | | |
|---|---|---|---|---|---|---|---|
| | EEA #1 | EEA #2 | EVA #1 | EVA #2 | EVA #3 | EVA #4 | SBS |
| $M_{300}$, p.s.i | 750 | 600 | 900 | 900 | 650 | 350 | 350 |
| $T_b$, p.s.i | 1,900 | 1,050 | 2,550 | 2,100 | 1,050 | 1,050 | 4,100 |
| $E_b$, percent | 740 | 700 | 700 | 720 | 760 | 800 | 900 |
| Set at break, percent | 530 | 500 | 580 | 560 | 520 | 75 | 15 |
| Shore A Hardness | 82 | 86 | 85 | 90 | 82 | 73 | 65 |
| "E" melt index, gm./10 min | 1.9 | 23 | 1.3 | 6.8 | 3.5 | 22 | 1.8 |

* EEA=ethylene-ethyl acrylate copolymer; EVA=ethylene-vinyl acetate copolymer; SBS=polystyrene-polybutadiene-polystyrene, block molecular weights: 9,500-47,000-9,500.

Blends of the first six polymers in Table III with the SBS polymer were prepared and molded by compression molding, utilizing two different levels of supplementary polymer in the compositions. Tables IV and V below summarize the physical properties of the blends so prepared.

Example II

In order to demonstrate that improved physical properties particularly relative to improved cut growth resistance, ozone resistance and solvent resistance are obtained even though other compound components are TABLE IV.—PROPERTIES OF BLENDS AT THE 20 phr. LEVEL COMPARED WITH BASE POLYMER

| | Type | | | | | | |
|---|---|---|---|---|---|---|---|
| | EEA #1 | EEA #2 | EVA #1 | EVA #2 | EVA #3 | EVA #4 | SBS Base polymer |
| Additive properties: | | | | | | | |
| Shore A Hardness | 82 | 86 | 85 | 90 | 82 | 73 | |
| "E" melt index, gm./10 min | 1.9 | 23 | 1.3 | 6.8 | 3.5 | 22 | |
| Blend properties: | | | | | | | |
| $M_{300}$, p.s.i | 500 | 400 | 500 | 400 | 450 | 350 | 325 |
| $T_b$, p.s.i | 3,350 | 3,150 | 3,150 | 3,400 | 3,600 | 2,850 | 4,300 |
| $E_b$, percent | 940 | 920 | 860 | 920 | 900 | 900 | 900 |
| Set, percent | 40 | 30 | 40 | 40 | 30 | 25 | 20 |
| $E_b$/set | 23 | 31 | 22 | 23 | 30 | 36 | 45 |
| Shore A Hardness | 69 | 68 | 70 | 65 | 64 | 65 | 64 |
| Melt Index | 1.4 | 2.2 | | 1.9 | | 2.6 | 1.8 |
| Ozone resistance hrs. to crack rating* of: | | | | | | | |
| 8 | 2.2 | 1.4 | >500 | 2.3 | 3.4 | 2.5 | 2 |
| 5 | 9 | 6 | >500 | 7.5 | 9 | 8.5 | 6 |
| 2 | 30 | 26 | >500 | 26 | 23 | 32 | 18 |
| Percent absorption of mineral white oil** | 360 | 370 | | 340 | 480 | | 510 |

*After exposure to 50 p.phr. ozone at a temperature of 90° F.
**After soaking rheometer extrudate (extruded at 135 sec.$^{-1}$) for 100 hrs. at 23° C.

TABLE V.—PROPERTIES OF BLENDS AT THE 50 phr. LEVEL COMPARED WITH BASE POLYMER

| | Type | | | | | | |
|---|---|---|---|---|---|---|---|
| | EEA #1 | EEA #2 | EVA 1 | EVA #2 | EVA #3 | EVA #4 | SBS Base polymer |
| Additive properties: | | | | | | | |
| Shore A Hardness | 82 | 86 | 85 | 90 | 82 | 73 | |
| "E" melt index, gm./10 min | 1.9 | 23 | 1.3 | 6.8 | 3.5 | 22 | |
| Blend properties: | | | | | | | |
| $M_{300}$, p.s.i | 600 | 500 | 500 | 550 | 450 | 400 | 325 |
| $T_b$, p.s.i | 2,100 | 2,400 | 2,750 | 2,400 | 2,400 | 2,250 | 4,300 |
| $E_b$, percent | 800 | 880 | 820 | 760 | 860 | 900 | 900 |
| Set, percent | 70 | 75 | 75 | 75 | 65 | 40 | 20 |
| Shore A Hardness | 73 | 70 | 74 | 74 | 73 | 67 | 64 |
| $E_b$/set | | | | | | | |
| "E" melt index, gm./10 min | 1.6 | 3.1 | | 2.5 | | 6.0 | 1.8 |
| Ozone resistance hrs. to crack rating of: | | | | | | | |
| 8 | 16 | 3 | >500 | 5 | >500 | 2.4 | 2 |
| 5 | 80 | 9 | >500 | 30 | >500 | 9.0 | 6 |
| 2 | 160 | 30 | >500 | 110 | >500 | 32 | 18 |
| Percent absorption of mineral white oil | 160 | 170 | | 160 | | 270 | 510 |

Similar blends with polyethylene and block polymer showed that the present classes of supplementary polymers result in blends which are softer, stronger, and more present, the following tests were performed. The block copolymer employed in the base compound was polystyrene-polybutadiene-polystyrene having block molecular weights 23,000–41,000–23,000. Table VI below presents the results obtained in comparison with the base compound from which the supplementary polymer was omitted.

same block copolymer compound and EVA described in the preceding example. Table VIII shows the great improvement in these properties in comparison with the control sample, which contained no EVA.

TABLE VI.—FORMULATIONS AND PROPERTIES OF EVA COMPOUNDS

|  | Base compound | EVA-1 | EVA-2 | EVA-3 | EVA-4 | EVA-5 | EVA-6 | EVA-7 |
|---|---|---|---|---|---|---|---|---|
| SBS block polymers | 100 | 100 | 100 | 100 | 100 | 100 | 100 | 100 |
| EVA-1 | 0 | 25 | 35 | 45 | 45 | 45 | 45 | 45 |
| Oil | 107 | 107 | 107 | 107 | 107 | 107 | 107 | 122 |
| Polystyrene | 60 | 60 | 60 | 60 | 40 | 30 | 20 | 60 |
| CaCO$_3$ | 75 | 75 | 75 | 75 | | | | |
| TiO$_2$ | 10 | 10 | 10 | 10 | 10 | 10 | 10 | 10 |
| Specific gravity | | | | | .973 | .970 | .967 | .973 |
| Melt flow condition (E), g./10 min | 43.9 | 17.8 | 18.6 | 18.2 | 16 | 24.8 | 26.7 | 33.3 |
| Hardness, milled sheet | 41 | 62 | 67 | 60 | 53 | 52 | 50 | 51 |
| Angle tear, p.l.i., compression molded | 120 | 159 | 169 | 149 | 149 | 129 | 115 | 133 |

The ethylene-vinyl acetate copolymer utilized for all of the above compounds was the same as EVA-1 given in Table III above.

The base compound when tested for flexing in a standard flex test (ASTM D-1052-55) fell to a low rating after about 100,000 flexes. However, when the base compound was modified with the subject ethylene-vinyl acetate copolymer in an amount of 45 phr. based on the block copolymer the flexing to the same rating required over 500,000 flexes.

Example III

The improvement in tear resistance of the compositions of this invention compared with the basic block copolymer in a suitable compounded stock was tested by means of mixing in ethylene vinyl acetate copolymer using injection molding as the mixing technique. The supplementary polymer was identical with EVA-1 described in Table VI above. Table VII which follows presents the data obtained on the blends so prepared. The data of special interest is that described as angle tear which indicates the improved tear resistance effected by the presence of the ethylene-vinyl acetate copolymer.

TABLE VII.—COMPOSITION AND PHYSICAL PROPERTIES OF BLENDS OF BLOCK COPOLYMER WITH EVA (MIXED DURING INJECTION MOLDING)

| (A) Composition: | | | |
|---|---|---|---|
| Parts Block Copolymer Compound * | 100 | 100 | 100 |
| Parts EVA | 0 | 25 | 50 |
| (B) Properties (on injection molded sheets): | | | |
| Tensile at break, p.s.i. | N 575 / P 525 | N 675 / P 625 | N 1,000 / P 700 |
| Elongation at break, percent | N 700 / P 300 | N 500 / P 320 | N 725 / P 325 |
| 300% modulus, p.s.i. | N 300 / P 525 | N 620 / P 525 | N 700 / P 550 |
| Set at break, percent | N 20 / P 5 | N 50 / P 25 | N 135 / P 50 |
| Flexural modulus, p.s.i. | N 310 / P 540 | N 345 / P 480 | N 1,050 / P 1,000 |
| Angle tear, p.l.i. | N 110 / P 130 | N 150 / P 170 | N 185 / P 215 |
| Shore A hardness | 45 | 58 | 67 |

*Compound—Block copolymer: polystyrene-polybutadiene-polystyrene, 46 parts by weight; Mineral oil, 70 parts by weight; Polystyrene, 33 parts by weight; CaCO$_3$, 15 parts by weight.
Note.—Test direction normal (N) or parallel (P) to flex during injection molding.

Example IV

The effect of ethylene-vinyl acetate copolymer on the ozone resistance and flex life was investigated, using the

TABLE VIII.—OZONE AND FLEX RESISTANCE OF BLENDS OF BLOCK COPOLYMER WITH EVA

| Block copolymer compound, parts | 100 | 100 | 100 |
|---|---|---|---|
| EVA, parts | None | 25 | 50 |
| (A) Ozone resistance, static, 50 p.p.h.m. ozone at ~90° F., injection molded flex bars (bent parallel to flow); hours exposure to give a rating [1] of: | | | |
| 8 | 30 | >300 | >300 |
| 5 | 120 | >300 | >300 |
| 2 | 250 | >300 | >300 |
| (B) Flex resistance, injection molded flex bars kilocycles flex to give a rating of (unpierced samples): | | | |
| 8 | 30 | >1,000 | >1,000 |
| 5 | 100 | >1,000 | >1,000 |
| 2 | 170 | >,1000 | >1,000 |
| Cut growth rate, kilocycles flex/in (pierced samples) | 150 | 700 | 8,000 |

[1] 10=unchanged; 0=completely broken.

Example V

A blend was prepared of equal parts of an ethylene-vinyl acetate copolymer containing 20% by weight of vinyl acetate and the block copolymer being polystyrene-polybutadiene-polystyrene. A sheet of this blend was heat-bonded under pressure to a polyethylene sheet, the conditions being 120° C. for 10 minutes at about 30 p.s.i. A strong bond was formed between the polyethylene and the blend. Attempts were made to bond the unmodified block copolymer to polyethylene sheet, but unsatisfactory results were obtained, the bond being subject to easy rupture by hand pulling.

Example VI

The block copolymer blend with ethylene-vinyl acetate copolymer was dissolved in toluene to form a 25% solution which was painted on polyethylene sheet. The solvent was allowed to evaporate and it was found that a tightly bonded laminate was so formed.

We claim as our invention:
1. A composition comprising
   (a) a block copolymer having the general configuration

$$A(B-A)_{1-5}$$

wherein each A is a polymer block of a monovinyl arene and each B is a polymer block of a conjugated diene; and hydrogenated derivatives thereof; and
   (b) 10–150 parts by weight per 100 parts by weight of the block copolymer of supplementary copolymers of the group consisting of (A) copolymers of ethylene with $C_{3-5}$ esters of terminally ethylenically unsaturated carboxylic acids and saturated aliphatic alcohols containing 8–33% by weight of the ester units and (B) copolymers of ethylene with $C_{3-5}$ esters of saturated monocarboxylic acids and terminally unsaturated aliphatic alcohols containing 8–33% by weight of ester units, and mixtures thereof.

2. A blend according to claim 1 wherein the block copolymer has the general configuration polystyrene-polybutadiene-polystyrene.

3. A blend according to claim 2 wherein the supplementary polymer is a copolymer of ethylene with vinyl acetate.

4. A blend according to claim 2 wherein the supplementary polymer is a copolymer of ethylene with ethyl acrylate.

5. A composition according to claim 1 wherein the supplementary copolymer is present in an amount between 25 and 75 parts by weight per 100 parts of block copolymer.

6. A composition according to claim 5 wherein the supplementary copolymer has a melt index between about 0.2 and 4.0.

References Cited

UNITED STATES PATENTS 3,299,174  1/1967  Kuhre et al. _____ 260—876

SAMUEL H. BLECH, Primary Examiner

U.S. Cl. X.R.

117—138.8; 161—253; 260—33.6, 41.5, 829